United States Patent [19]

Sharp et al.

[11] Patent Number: 5,016,926
[45] Date of Patent: May 21, 1991

[54] LATCHING MECHANISM

[75] Inventors: Douglas J. Sharp, Arlington; E. W. Smith, Burleson, both of Tex.

[73] Assignee: Doskocil Manufacturing Company, Inc., Arlington, Tex.

[21] Appl. No.: 497,999

[22] Filed: Mar. 23, 1990

Related U.S. Application Data

[63] Continuation of Ser. No. 196,248, May 20, 1988, Pat. No. 4,930,819.

[51] Int. Cl.$^5$ .............................................. E05C 9/04
[52] U.S. Cl. .............................. 292/42; 292/DIG. 63
[58] Field of Search .................... 292/32, 42, 153, 163, 292/175, 306, DIG. 63

[56] References Cited

U.S. PATENT DOCUMENTS

| | | | |
|---|---|---|---|
| 426,844 | 4/1890 | Murray et al. | 292/42 |
| 907,493 | 12/1908 | Gunther | 292/42 |
| 907,525 | 12/1908 | Rapson | 292/42 |
| 928,504 | 7/1909 | Dennis et al. | 292/175 X |
| 1,113,479 | 10/1914 | Phipps | 292/42 X |
| 1,653,184 | 12/1927 | Kolumbus | 292/42 X |
| 2,021,803 | 11/1935 | Nicola | 292/175 X |
| 2,294,708 | 9/1942 | Barnett | 292/42 |
| 2,936,189 | 5/1960 | Pearson | 292/DIG. 65 X |
| 3,874,716 | 4/1975 | Bancroft | 292/175 |
| 4,189,176 | 2/1980 | Hamilton | 292/153 X |
| 4,524,590 | 6/1985 | Budish | 292/57 X |

OTHER PUBLICATIONS

Photocopy of Model of Prior Art Disclosed in Spec. and Shown in Personal Interview in Parent Case, Titled "Old Doskocil Latch" 4 Sheets.

Primary Examiner—Richard E. Moore
Attorney, Agent, or Firm—Andrew J. Dillon

[57] ABSTRACT

A latching mechanism having utility in securing a pivotable member in at least one position with respect to a stationary structure. The housing includes a base that is adapted to be mounted adjacent the pivotable member (e.g., a cage door), with the base lying in a plane which is generally parallel to the plane established by the cage door. A pair of spaced flanges is affixed to the base, with each of the flanges extending away from the door and lying in planes which are generally perpendicular to the base. Each of the flanges has two openings which are adapted to slidably receive first and second elongated appendages, with both appendages being slidably held with respect to the housing, and with each appendage having an outer region extending outwardly away from the housing. The two latching appendages are adapted to move in different directions, with the appendage outer regions being configured to engage a portion of the stationary structure (i.e., the cage enclosure) so as to hold the cage door in a closed position. The latching mechanism includes a control device for manipulating the appendages so as to slidably move the latching appendages inwardly (with respect to the housing). The control device includes a pair of protuberances, each having a length which is sufficient as to be easily engaged by a single digit of a user's hand. A pair of coil springs is provided for continuously urging the appendages in different directions away from the housing. A pair of cap-like members are ideally affixed to the exterior surface of each of the protuberances so as to facilitate gripping the protuberances with at least one digit of a person's hand.

11 Claims, 3 Drawing Sheets

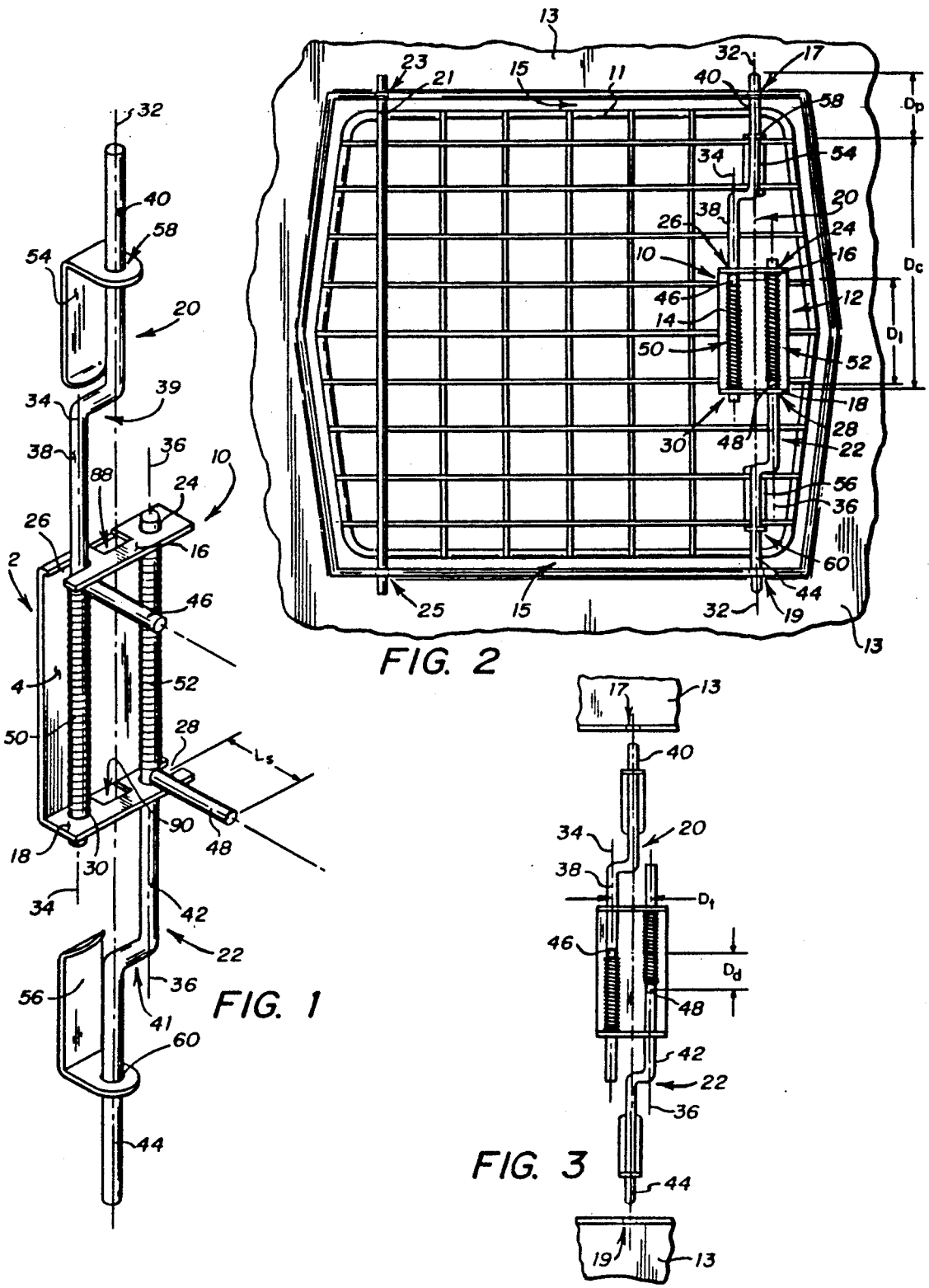

LATCHING MECHANISM

This application is a continuation of application Ser. No. 07/196,248, filed May 20, 1988 now U.S. Pat. No. 4,930,819, issued Jun. 5, 1990.

BACKGROUND OF THE INVENTION

This invention relates generally to latching devices for holding a pivotable member in a closed position with respect to a stationary structure; more specifically, it relates to a latching mechanism of the type that is adapted for holding the door of a cage (or kennel) in a fixed position with respect to an opening in a cage enclosure.

There has long been a practice of accommodating or transporting a wild or domesticated animal in relatively comfortable enclosure so as to provide shelter and safety for the animal. A portable enclosure such as a pet kennel is often used to conveniently transport a pet on local or distant trips. Portable pet kennels (also called cages) generally have latching mechanisms adapted to hold their doors closed, so as to keep a pet (i.e., a dog, cat, parrot, etc.) securely confined when the kennel is being shipped on a commercial carrier such as an airplane, ship, bus, etc. Also, many veterinary clinics request that pet owners bring their pets to the clinic on a leash—or restrained in a kennel—so as to prevent an excitable pet such as a dog from getting loose and chasing other animals (such as cats) which might also be in the clinic.

As a means for comfortably accommodating a pet at home, many pet owners furnish small houses or kennels for their pets—to provide a private place of refuge for the pet to relax and sleep. Also, some pets such as dogs, cats, etc., are not always as calm as their owners might like; and sometimes pets can become quite restless and pesky. If there is no place to confine a dog when it's in a fiesty mood or when a stranger is visiting a home, a poorly disciplined dog could run rampant around a house, chewing on expensive things and pestering house guests. Fortunately, most pet kennels provide a door latch for securing a kennel door in a closed position.

The door latches of many pet cages are adapted to engage the cage at only one location. Such latching mechanisms are usually affixed to the cage door and typically include a housing with only a single latching appendage. When the appendage is moved to its engaged position, it is inserted through a single aperture in the cage. This kind of latching mechanism may be adequate to shelter and contain small birds or animals with paws, but some animals could easily manipulate the single appendage and disengage the latching mechanism. For example, raccoons are known to be very dexterous, and they have hands and fingers (similar to those of a human) which are capable of gripping and manipulating objects. So, it is often possible for a mischievous raccoon inside a cage to reach through the cage door and disengage a latching mechanism that has only a single appendage. Also, a large and strong bird such as a parrot might be able to use its beak or foot to disengage a single-appendage latch.

A latching mechanism which positively holds a cage door closed is especially important for pet owners who may wish to confine their pets in a kennel outside the house. With a single-appendage latching mechanism, a strong or heavy animal may be able to throw itself against the cage door, causing a conventional flexible plastic cage to deform in such a way that the single appendage could become disengaged from its aperture.

Of course, there have been some prior art devices which have been proposed from time to time for more securely holding a cage door closed. These devices typically have two appendages which are adapted to engage the cage enclosure in two places. One such latching mechanism has an elongated housing affixed to a cage door, with the housing having upper and lower appendages which are biased so that they extend outwardly in opposite directions away from the housing. The upper appendage engages an upper aperture in the cage, while the lower appendage engages a lower aperture. Each appendage has a step or bend which is configured so that it may be engaged by a digit of a person's hand. To disengage the latching mechanism, the digits of the user's hand generally must be spread far apart, such that a thumb engages one bend and a finger engages the other bend. Unfortunately, the thumb and finger must be spread so far apart on such "prior art" devices that it is sometimes difficult and inconvenient to disengage both appendages simultaneously. Because this type of latch is sometimes difficult to use, it could prevent a child with small hands from opening a cage to retrieve and cuddle a pet. Also, persons with a short thumb-to-finger spread, or elderly persons with weakened hands, could be hindered from quickly and easily opening and closing a cage door.

While some of these prior art latching devices have solved at least a few of the problems inherent in securing doors for pet kennels, it seems that often the designers of these devices have ignored the safety of the secured pet and convenience of the pet owner. Accordingly, there has remained a need for a cage door latching mechanism which positively and safely holds a pet kennel door in a closed position, and which is adapted to be easily operated by both children and adults. It is an object of this invention to provide such a safe and convenient latching mechanism.

One more object is to provide a short protuberance on each of the appendages which extends far enough out of the front of the latching mechanism housing so that the protuberance may be easily contacted by at least one digit of a person's hand.

Still another object is to provide a dual-appendage latching mechanism that requires two oppositely-directed forces to disengage the mechanism, so that an animal (e.g., a raccoon, large parrot, etc.) inside the cage is prevented from diengaging the latching mechanism.

A further object is to provide a latching mechanism which has an attractive, cosmetic cover, with the latching mechanism being adapted to be easily disassembled for maintenance (if desired), such that the internal elements might be inspected, cleaned or replaced—if necessary.

These and other objects will be apparent from a study of the specification and the claims appended thereto, as well as reference to the attached figures of the drawing.

DESCRIPTION OF THE FIGURES OF THE DRAWING

FIG. 1 is a perspective view of one embodiment of the invention illustrating a latching mechanism having two latching appendages which are biased such that they extend outwardly away from a generally rectangular housing;

FIG. 2 is a front elevational view of the latching mechanism attached to a pivotable cage door, and showing the outer regions of each appendage engaged with the two apertures in a cage enclosure;

FIG. 3 is a front elevational view illustrating the latching mechanism in its disengaged configuration, with the appendages having been moved inwardly toward the housing and away from the two spaced apertures;

BRIEF DESCRIPTION OF THE INVENTION

Figure 4:
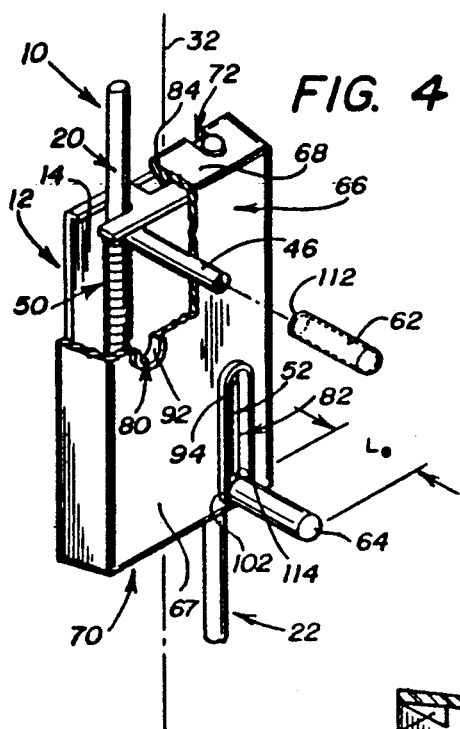
FIG. 4 is a perspective view of the latching mechanism with a removable cover attached to the housing, and showing a portion of the cover broken away so as to reveal a coil spring and its associated appendage with a protuberance affixed thereto.

In brief, the invention includes a latching mechanism having utility in securing a pivotable member in at least one position with respect to a stationary structure, e.g., a cage or kennel. The mechanism has a housing which includes a base that is adapted to be mounted adjacent the pivotable member (e.g., a cage door), with the base lying in a plane which is generally parallel to the plane established by the cage door. A pair of spaced flanges is affixed to the base, with each of the flanges extending away from the door and each lying in a plane which is generally perpendicular to the base. Each of the flanges has two openings, and each opening is sized to slidably receive an elongated appendage. The latching mechanism preferably includes first and second elongated appendages, with both appendages being slidably held with respect to the housing, and with each appendage having an outer region extending outwardly away from the housing. The two latching appendages are designed to move in different directions, with the appendage outer regions being configured to engage a portion of the cage (e.g., an aperture) so as to hold the cage door in a closed position.

The latching mechanism includes a control means for manipulating the appendages to slidably move the latching appendages inwardly (with respect to the housing); at least a portion of the control means is located exteriorly of the housing. The control means includes a pair of protuberances, one of which is affixed to each of the appendages, with each protuberance (or stub) being positioned on a given appendage and having a length which is sufficient as to be easily engaged by a single digit of a hand. Each of the projecting stubs preferably has a length of slightly less than one inch. A biasing means, including a pair of coil springs, is provided for continuously urging the appendages outwardly of the housing and in different directions. In this way, the outer region of each appendage is biased to a position where the outer region engages an aperture or the like so as to prevent the door from pivoting.

In order to protect the biasing means from becoming contaminated by dirt or objects which may interfere with operation of the latching mechanism, a cover is preferably provided to enclose the biasing means. In certain embodiments the cover may be removed so that the latching mechanism may be disassembled for inspection and, if necessary, maintenance; in other embodiments, the cover is permanently secured to the latching mechanism in order to preclude its disassembly and the loss of any parts. The cover has a plurality of openings which are sized to receive at least a portion of the control means and the appendages. A pair of cap-like members are ideally affixed to the exterior surface of each of the stubs so as to cover any sharp edges on the stubs and to facilitate gripping the stubs with at least one digit of a person's hand.

An optional fall-safe locking means is provided to prevent the latching mechanism from becoming inadvertently opened by either human or animal activity. The locking means includes an elongated structural member which is configured for mechanically blocking movement of the two stubs toward one another; such a structural member effectively "locks" the latching mechanism in its engaged mode at selected times, and it may be configured so that it is always present but completely passive until such time as it is needed.

Not only is the latching mechanism disclosed herein easy to use by children, adults and the elderly, but it is also advantageously constructed with two oppositely oriented latching appendages—and it has an optional locking means which can prevent dexterous pets (such as raccoons or monkeys) from manipulating the control means and disengaging the mechanism. In this way, a pet may be positively and safely held within an enclosure such as a pet kennel.

DETAILED DESCRIPTION OF A PREFERRED EMBODIMENT OF THE INVENTION

Referring initially to FIGS. 1 and 2, a latching mechanism 10 is shown for securing a door-like movable member 11 in a closed position with respect to a stationary structure 13. The latching mechanism 10 includes a housing 12, which is typically positioned immediately next to the door-like movable member 11, and the mechanism has structure that is configured to slidably receive two elongated appendages or rods 20, 22. The housing 12 has a generally elongated base 14 adapted to be affixed to the outer surface of the door-like member 11, so that the latch 10 may hold the door-like member next to an opening 15 in a stationary structure 13 (i.e., the cage enclosure). Located adjacent opposite ends of the base 14 are first and second flanges 16, 18 lying in planes which are generally perpendicular to the base and being oriented in such a way as to extend outwardly away from the door-like member 11 (which may be a door or lid). Each of the two flanges 16, 18 has a pair of openings (designated as 24, 26 on flange 16 and 28, 30 on flange 18) that are sized as to slidably receive first and second rods 20, 22 in such a way that the rods are mounted parallel to each other. The rods 20, 22 are configured to be moved longitudinally and outwardly away from the housing so as to engage a structural portion 17, 19 of the enclosure 13 and thereby hold the door 11 closed.

More specifically, the pair of openings in the first flange 16 includes an aperture 24 and slot 26. The pair of openings in the second flange 18 also includes an aperture 30 and slot 28; but the positions of the openings 30, 28 are reversed with respect to the positions of the openings 24, 26. And, the two slots 26, 28 are disposed such that they extend in opposite directions through to an outside edge of their associated flanges 16, 18 (as shown in FIG. 1). The flanges 16, 18 are preferably formed integrally with the base 14 from one piece of metal which is sufficiently rigid and durable as to withstand any friction which may result from sliding movement of the rods 20, 22. A suitable material is 16 guage, 1018 cold rolled steel; however, the housing could also be formed in one piece by a technique involving injection molding of a sturdy thermoplastic material.

The housing 12 has a centerline 32 extending in a longitudinal direction and being generally perpendicular to the orientation of the planar flanges 16, 18. The openings 24, 26 and 28, 30 of both flanges 16, 18 are arranged such that the slot 26 of first flange 16 and the aperture 30 of second flange 18 both lie along a longitudinal axis 34 which is generally parallel to centerline 32. Likewise, the aperture 24 and the slot 28 both lie along a longitudinal axis 36 which is generally parallel to centerline 32. Keeping the orientation of longitudinal axes 34, 36 in mind, it should be obvious that one of the slot/aperture pairs 26/30 and 28/24 cooperates to assist in guiding longitudinal movement of each of the elongated rods 20, 22.

Both elongated rods 20, 22 are identically configured in this embodiment, and they are preferably oriented about 180 degrees apart. The rods 20, 22 are mounted to move in opposite directions, with the first rod 20 having inner and outer segments 38, 40, and the second rod 22 having inner and outer segment 42, 44 (as considered with respect to the housing 12). The slot and aperture pair 26/30 is adapted to slidably receive the inner segment 38, while the slot and aperture pair 28/24 is adapted to slidably receive the inner segment 42. As seen in FIG. 1, the inner segment 38 has a longitudinal axis which is coincident with axis 34, and the inner segment 42 has a longitudinal axis which is coincident with axis 36.

The central axis of a given one of the outer segments 40, 44 is transversely offset from the central axis of an associated inner segment 38, 42 by two oppositely-directed ninety degree bends 39, 41; these bends are near the mid-region of their associated rods 20, 22. As a result, the central axes of both outer segments 40, 44 are coincident with the housing centerline 32. A biasing means (to be described) is adapted to urge the outer segments 40, 44 such that they extend outwardly away from the housing and toward the enclosure 13; the ends of each of the outer segments are configured to engage a portion of the enclosure. In this particular embodiment, the enclosure 13 (e.g., the pet cage) preferably has apertures 17, 19 (as shown in FIG. 2) which are configured to slidably capture the outer segments or regions 40, 44 and thereby prevent the cage door 11 from pivoting.

It will probably be appropriate to mention here that the outer segments 40, 44 are offset from axes 34, 36 so that the segments lie along the housing centerline 32, with the result that a typical cage door 11 may be reversibly mounted in the cage entrance 15. In this embodiment, the perimeter around the cage entrance 15 has a second set of apertures 23, 25 disposed laterally of the first set of apertures 17, 19 and on the opposite side of the entrance 15 (as shown in FIG. 2). The apertures 23, 25 are provided to slidably receive the outer ends of a pivot post 21 which is affixed to the cage door 11 in such a way that it is parallel with the housing centerline 32. The apertures 23, 25 are also configured to slidably receive the outer segments 40, 44 (both lying along centerline 32). And the apertures 17, 19 on the opposite side of the cage opening are also configured to slidably receive the pivot post 21—when the door is "flipped" and positioned such that the latch 10 is located on the left side of the entrance 15. Therefore, the cage door may be mounted so as to swing open to either the left or right side of the cage entrance 15, depending upon which side is most convenient for a person using the cage 13.

The latching mechanism 10 has a control means adapted to be selectively manipulated for axially retracting the elongated rods 20, 22 with respect to the housing 12. At least a portion of the control means is located externally of the housing 12 and has a sufficient size as to be engaged by at least one digit of a person's hand. The control means preferably includes two protuberances 46, 48 (i.e., stubs or posts) affixed, respectively, to their associated rods 20, 22 at an intermediate location on the rods. One of the stubs 46, 48 is positioned with respect to each of the rods 20, 22, such that the stub rests between the first and second flanges 16, 18 when its associated rod is installed in the housing 12. The biasing means (to be described in detail hereinafter) is configured to force each of the stubs 46, 48 outwardly to a position immediately next to an associated flange 16, 18. Each of the stubs 46, 48 has a length (designated $L_s$ in FIG. 1) so that it protrudes out of the front of the housing 12 for a distance that is far enough that the stub may be manipulated by a digit of a person's hand. But the stubs should not extend so far that they effectively become an obstacle, or that they become vulnerable to being damaged. The length of each stub 46, 48 is preferably about $\frac{3}{4}$ inch in the embodiment shown in FIG. 1, so that approximately $\frac{1}{2}$ inch will extend beyond a protective cover.

The rods 20, 22 are formed from a material which is relatively stiff so as to resist both torsional and bending loads. A preferred structural material for the rods is an elongated piece of cold rolled 1018 steel having a diameter of about $\frac{1}{8}$ inch. The stubs 46, 48 are ideally formed from the same material as the rods 20, 22, so that each stub may be easily butt welded to its associated rod.

As previously mentioned, the latching mechanism 10 includes a biasing means for continuously urging both rods 20, 22 in different directions away from the housing 12. The preferred biasing means comprises a pair of coil springs 50, 52 (e.g., compression springs), with one of the coil springs being circumferentially and slidably mounted about each of the inner segments 38, 42 in such a way as to be captured between the first and second flanges 16, 18. Each of the coil springs 50, 52 is adapted to urge its associated stub 46, 48 away from one flange and toward the other. With this in mind, it should be apparent that the coil springs 50, 52 are mounted for independently urging their associated appendages 20, 22 away from the housing and in directions which are substantially 180 degrees apart. Thus, an external force must be manually applied to each stub 46, 48 in order to (1) counteract the effect of its biasing compression spring 50, 52, and (2) disengage its associated appendage 20, 22. To disengage both appendages 20, 22, a first force is applied to the stub 46 to move it in one direction and a second force is applied to the other stub 48 to move it in the opposite direction. In this way the outer segments 40, 44 may be withdrawn from their enclosure apertures 17, 19.

To foster ease of use of the latching mechanism 10, each of the compression springs 50, 52 preferably has a spring rate of about 2½ pounds per inch. Because the stress in a given spring is sufficiently small, a single digit of an adult's or child's hand is capable of applying the external force—to a given one of the stubs 46, 48—that is required to axially compress a given spring 50, 52. The compression springs 50, 52 are preferably formed from music wire having a tensile strength of about 11,500 psi and being capable of withstanding repeated loading; each spring preferably meets ASTM A228 specifications. Suitable compression springs having a length of about 2" can be obtained from many manufacturers.

By virtue of the two oppositely-directed forces that are required to disengage both rods 20, 22, a door 11 will remain held in its closed position if just one of the rods is disengaged. With such a construction, most dexterous animals would effectively be prevented from disengaging the latch 10 from inside or outside of a cage 13. Because of the dual-appendages that are employed to hold the door 11 closed, it will be appreciated that this type of latch 10 satisfies commercial carrier standards for pet kennels that are to be shipped on an airline, busline, etc. If the kennel 13 is stored near objects such as luggage or freight, the latch 10 will not become completely disengaged even if a heavy object falls onto one of the rod stubs 46, 48 at just the right angle and with enough force in one direction to thereby cause one of the associated rods 20, 22 to become disengaged.

Referring still to FIG. 2, the latching mechanism 10 is shown affixed to the right side of cage door 11 so as to permit that door to be secured in a fixed position in relation to the cage entrance 15. The outer segments 40, 44 of appendages 20, 22 are shown in their engaged positions. That is, the outer segment 40 is shown engaged with (or inserted into) aperture 17 of enclosure 13, and outer segment 44 is shown engaged with aperture 19, such that the cage door 11 is positively and securely held in a closed position. To assist in guiding longitudinal movement of each of the outer segments 40, 44, first and second restraining members 54, 56 are affixed to the cage door 11 and are located externally of the housing 12. Each restraining member 54, 56 has an opening 58, 60 (which is perhaps more clearly seen in FIG. 1) which is sized to slidably receive an associated rod 20, 22. And each of the openings 58, 60 lies along the centerline 32 so that it is aligned with the central axes of both outer segments 40, 44. When so positioned, the restraining members 54, 56 ensure that the outer segments 40, 44 are positively inserted through or withdrawn from their associated enclosure apertures 17, 19. Each of the outer segments 40, 44 protrudes for a sufficient distance outwardly of each of the restraining member openings 58, 60 as to ensure positive engagement with the enclosure apertures 17, 19; the protruding distance is preferably about one inch, as represented by the dimension $D_p$ in FIG. 2.

After a careful examination of FIG. 2, it should be recognized that the second flange aperture 30 cooperates with the restraining member opening 58 to slidably capture the first rod 20. Similarly, the first flange aperture 24 cooperates with the restraining member opening 60 to slidably capture the second rod 22. The distance between a given one of the two apertures 24, 30 and its cooperating opening 58, 60 is sufficient to restrict sliding movement of an associated rod outer segment 40, 44 to movement that is in an axial direction—when the rod is moved between the engaged and disengaged positions. This distance is identified by notation $D_c$ in FIG. 2, and it will vary in proportion to the height of the enclosure entrance 15. If the height of the entrance 15 increases, the height of the cage door 11 as well as the length of the rods 20, 22 and the distance between the restraining members 54, 56 and housing 12 will generally be increased in unison. For an enclosure that is constructed to house a medium size dog (standing about 1¼ feet high at the shoulder), the distance $D_c$ will typically be approximately 5 inches. Generally, the distance $D_c$ will be about 80 percent of the length of a given rod 20, 22, such that most of a given rod is held between a flange aperture 30, 24 and its cooperating restraining member opening 58, 60.

The preferred longitudinal distance between the first and second stubs 46, 48 is approximately two inches when the outer segments 40, 44 are outwardly and fully extended away from the housing 12 so as to be respectively engaged with enclosure apertures 17, 19. This longitudinal distance is designated in FIG. 2 by the notation $D_L$. As shown in FIG. 3, the rods 20, 22 are adapted to be moved longitudinally inward toward the housing 12, such that the outer segments 40, 44 are disengaged (i.e., withdrawn) from the enclosure apertures 17, 19. When the outer segments 40, 44 are disengaged, the longitudinal distance between the stubs 46, 48 is decreased to approximately one inch, as shown by the notation $D_d$ in FIG. 3.

The transverse distance between the central axes 34, 36 of the inner segments 38, 42—as well as the transverse distance between the projecting stubs 46, 48—is ideally about ¼ inch, as represented in FIG. 3 by the dimension $D_t$. Keeping the small separation distances ($D_L$ and $D_t$) between the stubs 46, 48 in mind, it will be appreciated that simultaneously grasping both stubs 46, 48 and pinching them together is relatively easy when accomplished by at least two digits of an adult's or child's hand. Of course, the lateral separation distance $D_t$ between the inner segments 38, 42 also ensures that the outer segment of one rod will not likely interfere with the inner segment of the other rod when both rods 20, 22 are moved inwardly to their disengaged positions.

The latching mechanism 10 ideally includes a means for restricting and limiting the amount of axial movement that the rods 20, 22 and the compression springs 50, 52 are permitted to make with respect to the housing 12. This restricting/limiting means serves to not only prevent the rods 20, 22 from being withdrawn from their associated restraining member opening 58, 60, but also to prevent the coil springs 50, 52 from being compressed more than about 30 percent of their free, unloaded length. This limit on the amount of compression that the coil springs 50, 52 are permitted to experience is established to ensure that the lengths of the coil springs (when compressed to their permitted limits) remain significantly greater than would be the solid heights of the springs if they were fully compressed. In view of this, it will be appreciated that the service life of the coil springs 50, 52 is enhanced by limiting the amount of compression to which the springs may be exposed. The restricting/limiting means preferably comprises a cover 66 which is adapted to be attached to the housing 12, such that the cover 66 is immediately juxtaposed with the base 14, and the coil springs 50, 52 are enclosed by the cover.

Figure 5:
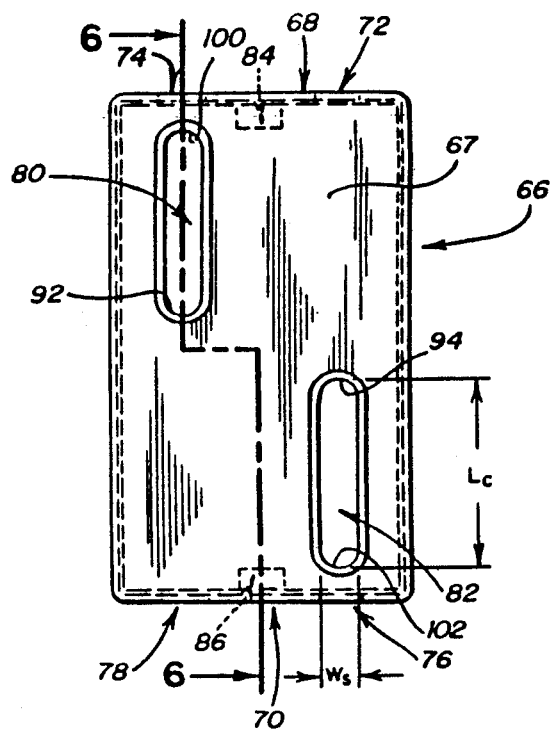
FIG. 5 is a front, elevational view of the cover illustrating a pair of elongated slots which are sized and positioned to slidably receive the pair of protuberances.

Turning next to FIGS. 4 and 5, it will be seen that the cover 66 envelops at least a portion of the rods 20, 22 and has elongated slots 80, 82 for receiving the rod stubs 46, 48 in such a way that the stubs extend through the slots. The length of the elongated slots 80, 82 is less than the potential movement that is possible with the rods 20, 22 when the cover 66 is removed from the housing 12. Also, the bottoms 92, 94 of the slots 80, 82 are significantly removed from the level at which the coil springs 50, 52 would reach if they were compressed to their solid height. With such a construction, the spatial interference between the stubs 46, 48 and the slot bottoms 90, 92 precludes any further compression of the coil springs (by virtue of precluding any further movement of the rods 20, 22) when the stubs have bottomed out against the slot ends 90, 92.

The cover 66 has ends 68, 70 which are configured so that they can assist in guiding sliding movement of the rods 20, 22 in a longitudinal direction. The two ends 68, 70 have arch-like openings (designated as 72, 74 on end 68 and 76, 78 on end 70) which are sized and positioned so as to slidably receive the associated rods 20, 22—when the cover 66 is attached to the housing 12. It should be apparent from FIGS. 4 and 5 that the arch-like openings 72, 74 and 76, 78 extend through to the edge of the ends 68, 70, so that the cover 66 may be pushed over the housing 12 as well as rods 20, 22 in the final stages of latch assembly. The cover slots 80, 82 are sized to slidably receive respective ones of the rod stubs 46, 48, with each elongated slot preferably having a length of about one inch, as represented in FIG. 5 by the dimension $L_c$. With this construction, the inward longitudinal movement of a stub 46, 48 and its associated outer segment 40, 44 is limited to the length of its associated elongated slot 80, 82—regardless of the separation distances of the two flanges 16, 18.

Figure 6:
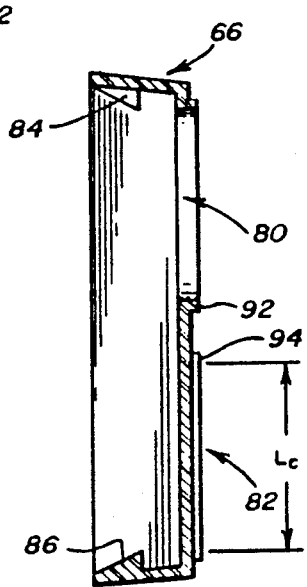
FIG. 6 is a side, cross-sectional view of the cover taken in the planes represented by the lines 6—6 in FIG. 5, and illustrating the position and shape of the ramp-like elements that are provided to detachably mount the cover to the housing.

Referring still to FIG. 5 and additionally to FIG. 6, two ramp-like elements 84, 86 are affixed to the interior surface of the cover ends 68, 70 for securely holding the cover in place over the housing 12. The flanges 16, 18 have mounting apertures 88, 90 (shown in FIG. 1) which are provided to detachably receive the ramp-like elements 84, 86. With the cover 66 attached, most of the interior of the housing 12 is shielded from dust, dirt, liquids, etc.; also, external objects are prevented from interfering with the operation of the internally mounted coil springs 50, 52. The cover is preferably formed from a thermoplastic material using an injection molding process; however, the cover could obviously be formed from a durable metal which could be bent and configured to fit over the housing 12. The preferred cover material is semi-flexible so as to permit the cover ends 68, 70 to be flexed slightly outward when the cover 66 is being attached or removed from the rigid housing 12. A suitable material is an impact-grade ABS thermoplastic material for injection molding, having properties similar to those marketed by E. I. DuPont De Nemours and Company Inc.

Referring again to FIG. 4, a pair of nipples or cap-like members 62, 64 is shown, with one of the cap-like members having a size which is sufficient to circumferentially cover at least most of the exposed exterior of each of the associated stubs 46, 48. The exterior surface of each cap-like member 62, 64 is advantageously adapted to foster gripping by a person's finger; to this end, the cap-like members are preferably formed from a soft, vinyl-like material. To permanently mount the cover 66 over the housing 12, at least one of the cap-like members 62, 64 may be adhesively affixed to the outer end of a stub 46, 48. Each cap-like member 62, 64 has a width which is greater than the width of an elongated slot 80, 82, so that the cover 66 may be securely and permanently captured between the members and the housing 12. The width of each slot 80, 82 is preferably about $\frac{1}{4}$ inch, as designated by the notation $W_s$ in FIGS. 5 and 6. The exposed length of each stub, with its nipple affixed, is preferably about $\frac{1}{2}$ inch. This length is identified in FIG. 4 by the notation $L_e$.

Figure 7:
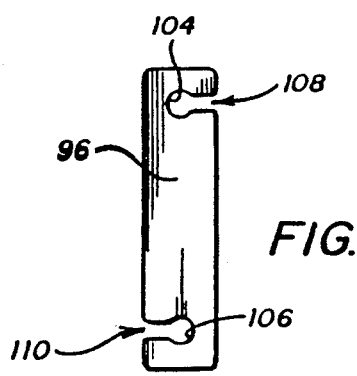
FIG. 7 is a frontal view of an elongated structural member which is configured so that it may be selectively wedged between the two latch protuberances when they are in their most separated positions.
Figure 8:
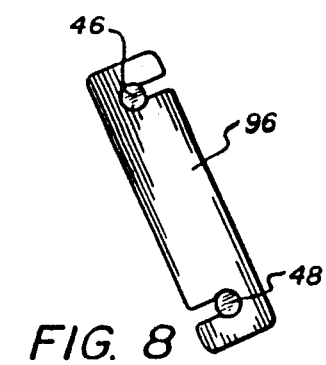
FIG. 8 is a frontal view illustrating one way in which the apertures of the structural member may be attached to the protuberances so as to mechanically block movement of the protuberances toward one another—to thereby "lock" the latching mechanism in its "closed" mode.

In the event that there is a desire to be 100% assured that the latching mechanism 10 will not become inadvertently opened by either human or animal activity, an optional fail-safe lock may be used to keep the latch engaged. This "locking" addition to the basic latch 10 may be considered to be an improvement upon, or enhancement to, the structure that has thus far been described; and its presence or absence will not affect the operability of the basic latch. Specifically, the optional attachment constitutes a means for mechanically blocking movement of the two protuberances 46, 48 toward one another—to an "unlatched" position; this will effectively lock the latching mechanism in its engaged mode. Referring to FIGS. 7 and 8, such a locking means preferably constitutes a unitary structure 96 which is sized and shaped so that it may be selectively wedged between the two protuberances 46, 48 when they are in their most separated positions. The structure 96 preferably has an elongated shape, with a length that is greater than the separation distance between the two protuberances 46, 48 when they are in their most separated position (as shown in FIG. 4). Of course, the actual separation distance, as measured along a diagonal line from protuberance 46 to protuberance 48, will be slightly longer than the longitudinal distance $D_L$ shown in FIG. 2.

Figure 9:
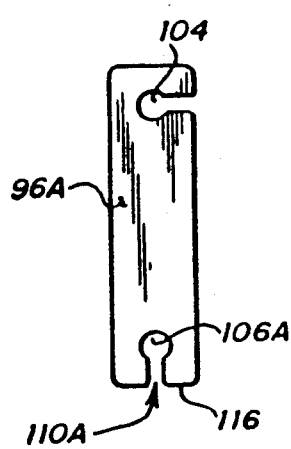
FIG. 9 is a frontal view of another embodiment of the structural member, and showing the throat of one aperture extending in a longitudinal direction (with respect to the elongated structural member) through to the edge of one end of the structural member.
Figure 10:
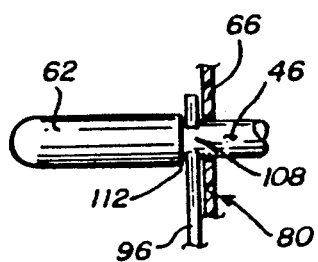
FIG. 10 is a fragmentary side view (i.e., profile) of the structural member as it would appear when one of the apertures is engaged with a protuberance, this view also showing how the structural member may be secured between the end of a nipple and the face of the latch cover.

The elongated structural member 96 includes a means for slidably engaging at least one of the cylindrically shaped protuberances 46, 48, which is most readily accomplished from one side of the structural member; this engaging means preferably includes first and second apertures 104, 106, with one of the apertures being located near each of the two ends of the structural member (as shown in FIG. 7). However, the apertures and their approach "throats" do not have to be oriented in the same direction, and they could be located and oriented differently, as shown in FIG. 9. The apertures 104, 106, 106A are round and are ideally sized to permit at least some rotation with respect to the periphery of a respective protuberance 46, 48; each of the apertures is associated with a temporarily deformable entrance throat 108, 110, 110A which is slightly smaller than the diameter of the protuberances. Referring again to FIG. 4 and additionally to FIG. 10, the structural member 96 is sufficiently thin so that an aperture throat 108, 110, 110A may be inserted between a nipple entrance 112, 114 and the outer face of an associated slot 80, 82. In this way, the structural member 96 may be attached to the latching mechanism 10 externally of the cover 66 by manually forcing one or both ends of the member sideways—in the direction of the adjacent protuberances 46, 48; enough pressure will temporarily stretch the respective throats 108, 110, 110A until the apertures 104, 106, 106A "snap" into place around their associated protuberances.

To preclude a small child or a dextrous animal (such as a monkey or raccoon) from disengaging the locking means, the structural member 96 is ideally configured so as to resist a significant compression load without experiencing any permanent deformation. By providing a sturdy structural member 96, any inward movement of the rods 20, 22 (which could lead to opening the latch) can be precluded. Another feature of the structural member's "locking" capability is that the configuration of each protuberance 46, 48 and the geometry of the structural member 96 may be made such that a substantial manual force is required to force the structural member into and out of engagement with the protuberances. With a preferred construction, the strength that is typical of an adult human hand is required to engage or disengage the structural member 96 from a fail-safe condition with respect to the latching mechanism 10.

Figure 11:
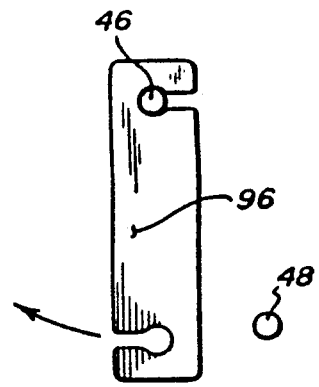
FIG. 11 is a frontal view of the structural member in a "stored" mode, with the structural member being pivotally suspended from a single protuberance.

Referring next to FIG. 11, when the structural member 96 is not in use, the fact that it can be pivotally suspended from one of the protuberances 46, 48 means that the structural member can be effectively "stored" or "parked" in a way that it will not interfere with normal operation of the biasing means 50, 52. By attaching the structural member 96 in this way, it may be quickly pivoted at any time to a "blocking" position—and the latch may then be considered to be effectively locked. By the judicious selection of relative sizes between the diameters of the protuberances and the inner diameters of the apertures (as well as their throats), the ease with which a latch can be either "locked" or "unlocked" with member 96 can be affected. That is, if there is a very tight fit between the outer diameter of a protuberance and the size of a throat 108, it will be much harder to engage the two than if there is a loose fit; and such a tight fit would naturally be preferred for confining animals such as monkeys, etc.

To assemble the basic latch 10, the housing 12 is positioned immediately next to a door-like member (like that shown in FIG. 2), such that the housing centerline 32 is coincident with a longitudinal axis extending through both enclosure apertures 17, 19. Next, the housing is moved in a longitudinal direction to a position where the housing is disposed equidistantly between the outer, transversely extending edges of the door (in relation to the housing centerline 32). Assuming that the cage door is constructed of steel, the base 14 may be spot welded to it, such that the housing 12 may be permanently affixed to the door 11; however, the housing could also be configured to be detachably mounted to a portion of the door or enclosure 13. The restraining members 54, 56 may be permanently welded or detachably mounted to the door 11 at an appropriate location so as to be aligned with the centerline 32; the restraining members should be positioned far enough from the housing 12 so that they do not interfere with axial movement of the latching rods 20, 22. Next, the coil springs 50, 52 are circumferentially and slidably mounted about their associated rods 20, 22. One of the two latching rods 20, 22 is slidably mounted (with respect to the housing 12) in each of the cooperating slot and aperture pairs 26/30 and 24/28. For example, the free end of inner rod segment 38 is inserted through aperture 30, and the stub 46 is temporarily pushed longitudinally inward so as to compress the coil spring 50 to nearly its solid height. Then, the rod 20 is pivoted (about aperture 30) by moving its free end transversely toward the housing until it is cradled by slot 26, as indicated in FIG. 7. The inward longitudinal pressure on stub 46 is held until the outer end of segment 40 is inserted through opening 58 of the restraining member 54, and then the pressure may be released. The same mounting procedure as described above should be followed for rod 22 and its coil spring 52. The coil springs 50, 52 are adapted to urge the rods 20, 22 outwardly such that they engage a structural part of the enclosure 13, thereby holding the door 11 in its latched position. The cover 66 is placed over the stubs 46, 48 and is pushed into engagement with the housing 12. To complete the assembly procedure, an adhesive or other bonding agent may be used to permanently affix the cap-like members 62, 64 to the projecting stubs 46, 48. If the cap-like members 62, 64 are not permanently affixed to the stubs 46, 48, the cover 66 may be selectively removed so that the latching mechanism 10 may be conveniently disassembled for maintenance and inspection.

The dimensions of housing 12 and cover 66 may be standardized, so that one size may be advantageously used with different sized pet kennels, regardless of the size of the kennel opening. It will be appreciated that the simple assembly procedures and standardized construction of the latching mechanism 10 contribute to minimize its unit cost, and make it economical to manufacture in large quantities for small, medium and large size pet kennels.

In use, the latching mechanism 10 may readily be engaged or disengaged by use of either a person's right or left hand—with the projecting stubs 46, 48 having a length so that each stub may be easily manipulated by a person's digit. Assuming that the latch 10 is engaged with the apertures 17, 19 (as shown in FIG. 2), both rods 20, 22 may then be readily disengaged at the same time by using two digits of a person's hand. Preferably, the thumb and index finger are spread apart about 2½ inches, with the thumb being positioned over the protruding stub 46 and the index finger being positioned underneath the protruding stub 48. Then, the thumb and index finger are brought together in a generally longitudinal direction so as to bear against the stubs 46, 48. Inward pressure is applied to each of the two stubs 46, 48 to overcome the outwardly directed biasing force imparted to the stubs by the coil springs 50, 52—and to overcome any friction force between the segments 40, 44 and the enclosure apertures 17, 19. The stubs 46, 48 are moved inwardly toward each other until the outer ends of the segments 40, 44 are totally withdrawn from their associated enclosure apertures 17, 19 as shown in FIG. 3. While holding inward pressure on the stubs 46, 48, the door 11 may be pivoted outwardly away from the enclosure entrance 15 to an open position, such that a person may reach in and retrieve a pet or let the pet come out at its own leisure.

To engage the latching rods 20, 22 with the enclosure apertures 17, 19 and fix the pivotable door 11 in its closed position, the stubs 46, 48 are once again pinched inwardly to the positions shown in FIG. 3. At the same time, the door 11 is pushed to its closed position, such that the outer ends of the rods 20, 22 are aligned with their associated enclosure apertures 17, 19. When the inward pressure on the stubs 46, 48 is slowly released, the coil springs 50, 52 will urge the outer ends of the rods 20, 22 into their respective enclosure apertures 17, 19.

Figure 12:
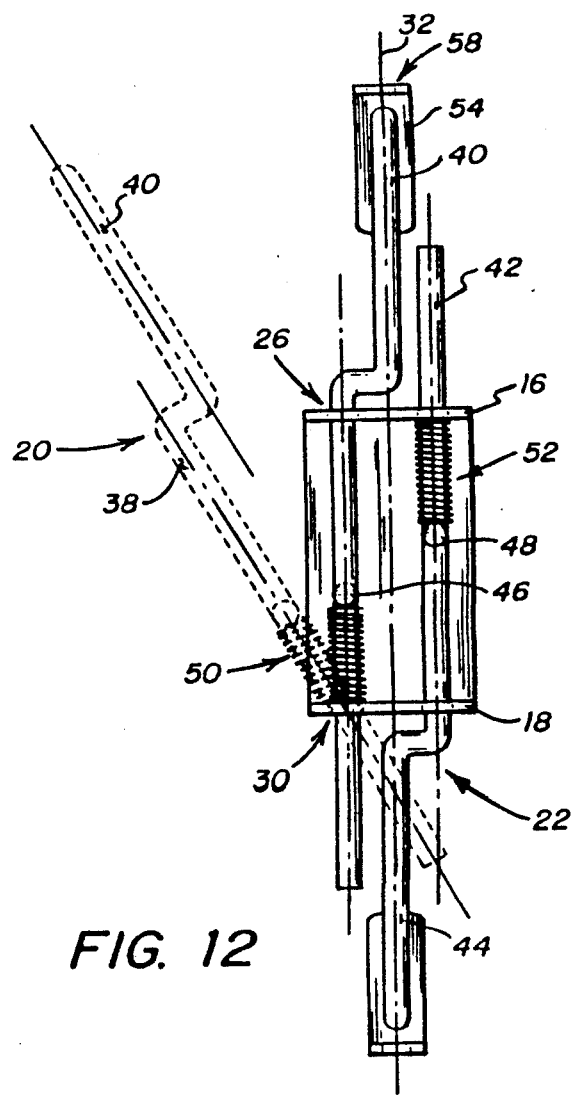
FIG. 12 is front, elevational view of the latching mechanism illustrating both appendages moved inwardly, with the coil springs compressed nearly to their solid height, and showing one appendage in broken lines as it might appear if it were moved transversely away from the housing for replacement or maintenance.

In order to remove a given rod (e.g., rod 20) from the latching mechanism 10, the distal segment 40 must first be withdrawn from its associated enclosure aperture; continued axial movement of the rod will eventually bring it below its associated restraining member opening 58. This is accomplished, of course, by causing at least one digit of a person's hand to engage the stub 46 and force it downwardly toward flange 18; the compression spring 50 will be axially and inwardly deflected for a distance which is slightly greater than the rod protruding length $D_p$ (shown in FIG. 2). Without the restraint that is imposed by a cover 66, the rod 20 may be rotated or moved transversely away from its cradling flange slot 26 (as shown in FIG. 12), such that the rod may be slidably withdrawn from flange aperture 30 and removed from the latching mechanism 10 for maintenance or replacement (if necessary). To permit this tilting of the rod 20 with respect to the flange 18, there must be ample clearance around the rod with respect to aperture 30; when the rod has a diameter of about 0.175 inch, and the thickness of the flange is about 0.062 inch, the aperture 30 should have a diameter of about 0.188 inch. The same removal procedure as described above would be followed for the second rod 22.

While the above discussion with respect to a pet kennel has described one appropriate way of utilizing the dual-appendage latching mechanism 10, this invention should not be considered as being limited to use on just enclosures or kennels for animals. For example, the latch could be mounted and utilized on a door for permitting access to a piece of machinery or a storage compartment, or it could be used on a rotatable display case so as to secure the case in a fixed position. Too, the latch could be used with a rotatable serving tray commonly referred to as a "lazy Susan"—so as to hold the rotatable tray in a fixed position with respect to a stationary structure such as a table or kitchen cabinet. In addition, the appendages could be oriented at 90 degrees—instead of at 180 degrees—with respect to each other, such that one appendage moves in a generally longitudinal direction, and the other moves in a generally transverse direction (with respect to the housing). Furthermore, the latching mechanism described herein is clearly insensitive to its orientation, and it could be mounted longitudinally or up-side down, etc., without altering its effectiveness. (The directions of "up" and "down" as used herein should be understood to be matters of convenience in describing the structure, and are not meant to be limiting.) So the latch could be used horizontally on a bait box, or the latch could be used to secure a temporary partition in any of a variety of optional locations—such as when a homemaker wishes to divide the storage space in a closet or freezer, etc. Also, those skilled in the art will appreciate that variations can be made in the construction of the latching mechanism without departing from the spirit of the invention. For example, the elongated rods 20, 22 have been disclosed as being identical and containing two 90 degree bends; however, this invention could also be employed with rods that are not identical, as well as with rods having other than 90 degree bends—or even no bends at all.

As for the optional locking bar 96, it can be made with such a tight fit that it will essentially restrict opening of the latch to adults who have at least ordinary strength in their hands. So, even if a monkey was smart enough to figure out that there seems to be a relationship between the locking bar and a secured door, the monkey would not have the requisite strength—at least in the direction that is required—to achieve its release. In effect then, the locking member can be made to be as strong and as tight as a designer might feel is justified, in view of the animals that are to be confined. Thus, any specific structure shown herein is intended to be exemplary and is not meant to be limiting, except as described in the claims appended hereto.

What is claimed is:

1. A latching mechanism having utility in holding a door-like member in a fixed position with respect to an opening in an enclosure, comprising:

a housing adapted to be affixed to said door-like member, said housing having first and second flanges located adjacent opposite sides of said housing, each flange having at least two openings disposed therein, said at least two openings sized as to slidably receive a pair of rods;

a first and second elongate rod slidably mounted with respect to said housing in each of said at least two openings, each rod having an inner segment and an outer segment as considered with respect to said housing, the respective outer segment of each of said pair of rods extending outwardly from said housing at opposite ends of said housing;

a stub affixed to each of said rods at a point within said inner segment wherein each stub shall protrude from said housing between said first and second flange, each stub having a length which permits manipulation by a person's digit; and biasing means mounted within said housing and adapted to urge said first and second elongate rod outward from said housing.

2. The latching mechanism as claimed in claim 1 and further including a pair of cap-like members, each having an exterior surface that is adapted to foster gripping, and each being adapted to circumferentially cover at least most of the exposed exterior of an associated stub, whereby the gripping surface of a cap-like memeber facilitates manipulation by at least one digit of a person's hand.

3. The latching mechanism as claimed in claim 1 wherein the longitudinal distance between the first and second stubs is about two inches when the associated rods are fully extended so as to be engaged with the enclosure, and the longitudinal distance between the first and second stubs being decreased to about one inch when the rods are in their disengaged position, and the transverse distance between the two stubs being about three quarters of an inch, whereby the step of simultaneously grasping both stubs and pinching them together is relatively easy when using at least two digits of an adult's or child's hand.

4. The latching mechanism as claimed in claim 1 and further including a cover adapted to juxtaposed over said housing and attached to said housing so as to enclose said biasing means, and the ends of said cover being adapted to assist in guiding the anticipated sliding movement of the rods in a longitudinal direction, said cover having a pair of elongate slots which are sized to slidably receive respective ones of the stubs.

5. The latching mechanism as claimed in claim 4 wherein each stub has a length such that it will protrude about one-half inch beyond the face of the cover, whereby engaging a given stub with a digit of a person's hand is facilitated.

6. The latching mechanism as claimed in claim 4 and further including a cap-like member adapted to be adhesively affixed to the outer end of each of the stubs, each cap-like member having a width which is greater than the width of an elongated slot of the cover such that the cover is captured between said cap-like members and the housing when the cap-like members are affixed to the stubs.

7. The latching mechanism as claimed in claim 4 wherein said elongate slot of the cover is about one inch long, and the inward longitudinal movement of an associated stub and its associated outer segment is limited to the length of an associated elongate slot in the cover.

8. The latching mechanism as claimed in claim 1 and further having a first and second restraining members for assisting in guiding axial movement of the rods, each restraining member being located outside of the housing and having an opening sized to slidably receive an associated rod.

9. The latching mechanism as claimed in claim 1 wherein the central axes of the rod inner segments are about three-quarters of an inch apart, such that the outer segment of one rod will not interfere with the inner segment of the other rod when both rods are simultaneously moved inward toward the housing.

10. The latching mechanism as claimed in claim 1 and further including means for restricting the amount of axial movement that said rods are permitted to make with respect to the housing.

11. The latching mechanism as claimed in claim 1 wherein said biasing means comprises a pair of coil springs circumferentially and slidably mounted about respective ones of the rod inner segments as to be captured within the housing.

* * * * *